(12) United States Patent
Yen

(10) Patent No.: US 11,501,741 B2
(45) Date of Patent: Nov. 15, 2022

(54) E-PAPER DISPLAY DEVICE AND A METHOD FOR DRIVING AN E-PAPER DISPLAY DEVICE

(71) Applicant: E Ink Holdings Inc., Hsinchu (TW)

(72) Inventor: Wei-Han Yen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/099,782

(22) Filed: Nov. 17, 2020

(65) Prior Publication Data

US 2021/0256936 A1     Aug. 19, 2021

(30) Foreign Application Priority Data

Feb. 18, 2020   (TW) .................................. 109105103

(51) Int. Cl.
*G09G 5/36*     (2006.01)
*G09G 3/34*     (2006.01)

(52) U.S. Cl.
CPC .......... *G09G 5/363* (2013.01); *G09G 3/3433* (2013.01); *G09G 2360/02* (2013.01)

(58) Field of Classification Search
CPC .. G09G 3/3433; G09G 5/363; G09G 2360/02; G09G 2310/06; G09G 3/38; G09G 3/2014; G09G 3/344; G09G 2230/00
See application file for complete search history.

(56) References Cited

U.S. PATENT DOCUMENTS

| | | | |
|---|---|---|---|
| 5,146,548 A * | 9/1992 | Bijnagte | H04N 1/4072 358/1.18 |
| 8,830,258 B2 | 9/2014 | Rhodes et al. | |
| 2008/0309636 A1 | 12/2008 | Feng et al. | |
| 2008/0309648 A1 | 12/2008 | Erol et al. | |
| 2012/0206467 A1* | 8/2012 | Shih | G09G 3/344 345/545 |
| 2012/0274620 A1* | 11/2012 | Hwang | G09G 3/3433 345/211 |
| 2013/0106806 A1 | 5/2013 | Serikov et al. | |

(Continued)

FOREIGN PATENT DOCUMENTS

| | | |
|---|---|---|
| CN | 1837908 | 9/2006 |
| CN | 102760299 | 10/2012 |

(Continued)

OTHER PUBLICATIONS

"Office Action of Taiwan Counterpart Application", dated Mar. 3, 2021, p. 1-p. 6.

(Continued)

*Primary Examiner* — Abbas I Abdulselam
(74) *Attorney, Agent, or Firm* — JCIPRNET

(57) ABSTRACT

An e-paper display device including an e-paper display panel, a graphics library and a display controller is provided. The display controller is coupled to the e-paper display panel. The display controller is configured to receive a line segment input signal and call the graphics library, and then drive, using a set of signal waveforms, the e-paper display panel to display a line segment. The set of signal waveforms is generated according to the line segment input signal and the graphics library. The line segment includes at least one gray level. In addition, a method for driving an e-paper display device is also provided.

8 Claims, 5 Drawing Sheets

(56) References Cited

U.S. PATENT DOCUMENTS

| | | | |
|---|---|---|---|
| 2014/0098081 A1* | 4/2014 | Chiu ................... | G09G 3/3696 |
| | | | 345/211 |
| 2016/0062491 A1 | 3/2016 | Shibata et al. | |
| 2016/0328486 A1 | 11/2016 | Liang et al. | |
| 2017/0031564 A1* | 2/2017 | Peterson ............. | H04L 65/4007 |
| 2018/0267643 A1 | 9/2018 | Crounse et al. | |
| 2020/0097526 A1* | 3/2020 | Ghosh .................. | G06F 16/958 |

FOREIGN PATENT DOCUMENTS

| | | |
|---|---|---|
| CN | 103093725 | 12/2016 |
| CN | 107430481 | 12/2017 |
| CN | 108230424 | 6/2018 |
| TW | I282947 | 6/2007 |
| TW | 201319926 | 5/2013 |
| TW | I399715 | 6/2013 |
| TW | I665640 | 7/2019 |
| WO | 2013124952 | 8/2013 |

OTHER PUBLICATIONS

"Office Action of China Counterpart Application", dated Feb. 24, 2022, p. 1-p. 8.

\* cited by examiner

E-PAPER DISPLAY DEVICE AND A METHOD FOR DRIVING AN E-PAPER DISPLAY DEVICE

CROSS-REFERENCE TO RELATED APPLICATION

This application claims the priority benefit of Taiwan application serial no. 109105103, filed on Feb. 18, 2020. The entirety of the above-mentioned patent application is hereby incorporated by reference herein and made a part of this specification.

BACKGROUND

Technical Field

The disclosure relates to a display device and a method for driving a display device, and in particular, to an e-paper display device and a method for driving an e-paper display device.

Description of Related Art

In the related art, when a static database SWTCON is used to draw a line in a handwriting mode, coordinate values of X and Y are obtained from the Android system end to connect the points as a line segment displayed on an e-paper display device. Each pixel of the line segment drawn in this manner is merely black without any gray level. At the time of display, a signal waveform set supporting only black and white is used to drive the e-paper display device. Therefore, the line segment eventually displayed on the e-paper display device is merely black, and is likely to show a zigzag shape when it displayed on an e-paper display device with a relatively small resolution.

SUMMARY

The invention provides an e-paper display device and a method for driving an e-paper display device, which can drive an e-paper display panel to display a relatively smooth line segment.

The e-paper display device of the invention includes an e-paper display panel, a graphics library, and a display controller. The display controller is coupled to the e-paper display panel. The display controller is configured to receive a line segment input signal and call the graphics library according to the line segment input signal, and then drive, using a set of signal waveforms, the e-paper display panel to display a line segment. The set of signal waveforms is generated according to the line segment input signal and the graphics library. The line segment includes at least one gray level.

A method for driving an e-paper display device of the invention includes: receiving a line segment input signal; calling a graphics library according to the line segment input signal to generate a set of signal waveforms; and driving, using the set of signal waveforms, the e-paper display panel to display a line segment. The line segment includes at least one gray level.

In an embodiment of the invention, the gray level includes a white gray level, a black gray level, a first gray level, and a second gray level.

In an embodiment of the invention, the graphics library is a two-dimensional graphics library.

In an embodiment of the invention, the graphics library is a SKIA graphics library.

In an embodiment of the invention, the line segment input signal is a handwritten input signal or a pen-written input signal.

In order to make the above features and advantages of the invention more comprehensible, embodiments are hereinafter described in detail with reference to the accompanying drawings.

DESCRIPTION OF THE EMBODIMENTS

Figure 1:
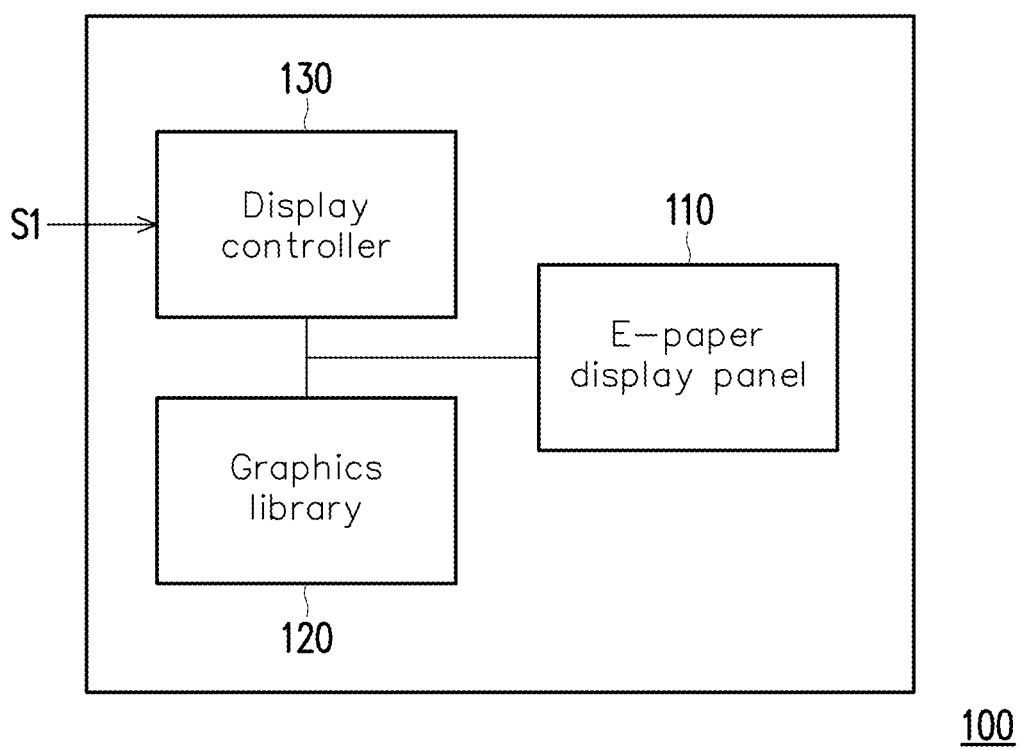
FIG. 1 is a schematic diagram of an e-paper display device according to an embodiment of the invention.
Figure 2:
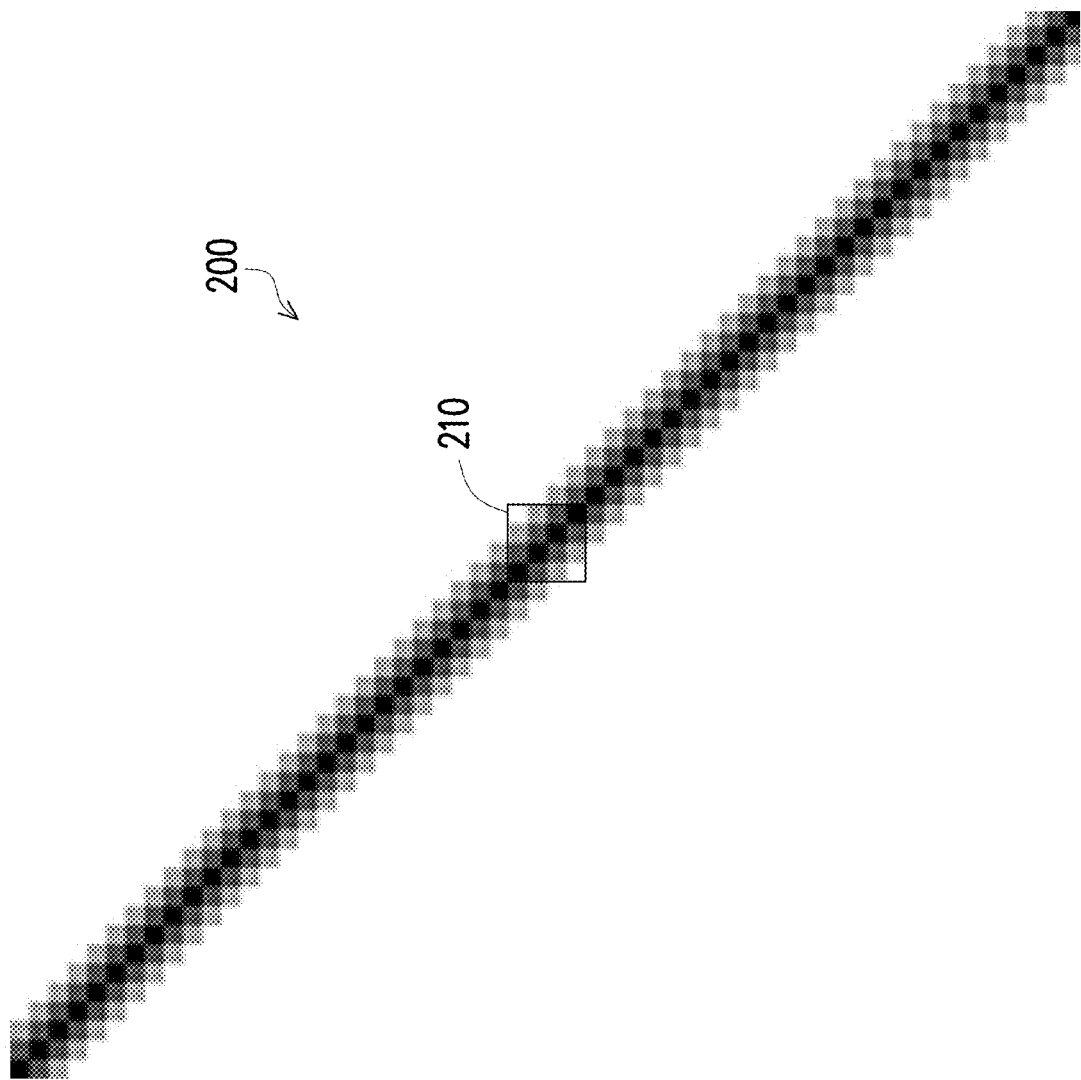
FIG. 2 is a schematic outline diagram of displaying stroke input by the e-paper display device in the embodiment of FIG. 1.
Figure 3:
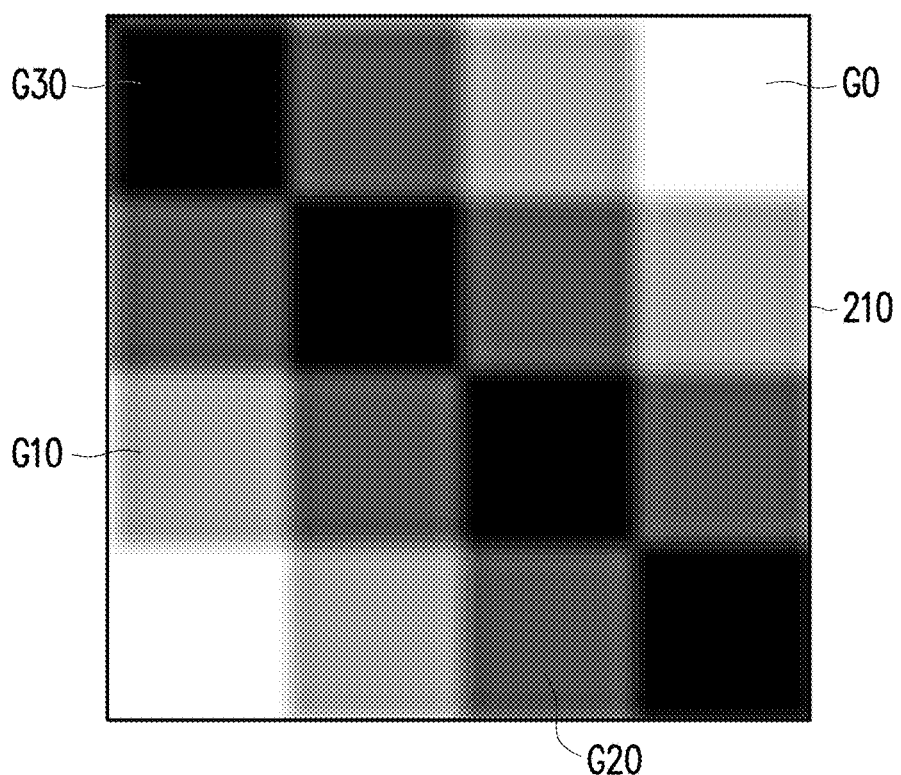
FIG. 3 is a schematic outline diagram of a pixel of a handwritten line segment in the embodiment of FIG. 2.

FIG. 1 is a schematic diagram of an e-paper display device according to an embodiment of the invention. FIG. 2 is a schematic outline diagram of displaying stroke input by the e-paper display device in the embodiment of FIG. 1. FIG. 3 is a schematic outline diagram of a pixel of a handwritten line segment in the embodiment of FIG. 2. Referring to FIG. 1 and FIG. 2, an e-paper display device 100 of the present embodiment includes an e-paper display panel 110, a graphics library 120, and a display controller 130. The graphics library 120 is, for example, a graphics library stored in a memory storage apparatus. The display controller 130 is coupled to the e-paper display panel 110. The display controller 130 is configured to receive a line segment input signal S1, and call the graphics library 120 according to the line segment input signal S1, and then drive, using a set of signal waveforms, the e-paper display panel 110 to display content of the line segment input signal S1, that is, a line segment 200. The line segment 200 of the set of signal waveforms is generated based on the line segment input signal S1 and the graphics library 120. The line segment 200 includes a plurality of gray levels. The line segment 200 may be a handwritten line segment or a pen-written line segment. The line segment input signal is an input made by a user on the e-paper display panel using a pen, a hand, or other tools. In the embodiment of the invention, the line segment input signal is a pen input signal.

In the present embodiment, the graphics library 120 is, for example, a SKIA graphics library (two-dimensional graphics library). In FIG. 3, a plurality of pixels 210 of the line segment 200 may include a white gray level G0, a black gray level G30, a first gray level G10, and a second gray level G20. An embodiment of the gray level displaying mode may be, for example, driven by schematic outline diagrams of a set of signal waveforms in FIG. 4 to FIG. 6.

Figure 4:
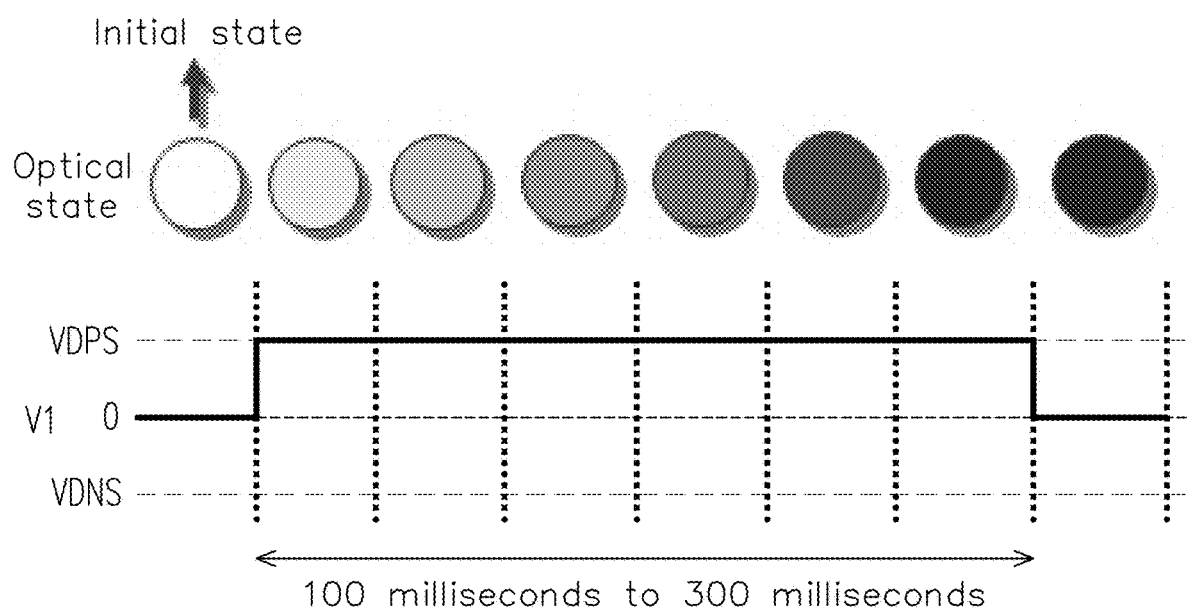
FIG. 4, FIG. 5, and FIG. 6 are schematic diagrams of a set of signal waveforms according to an embodiment of the invention.
Figure 5:
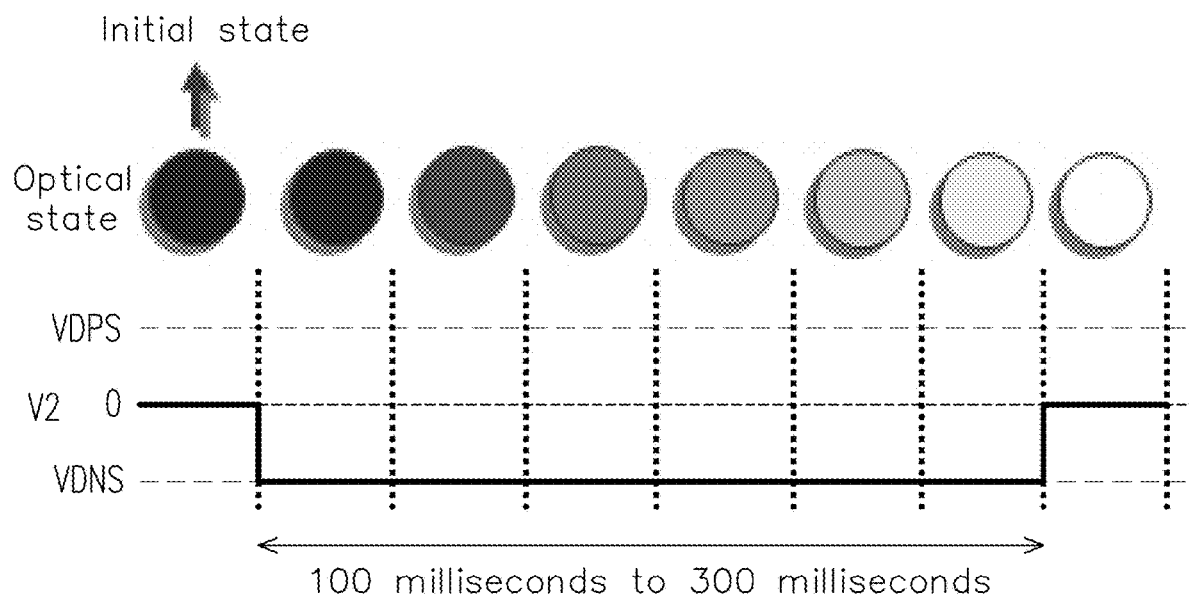
Figure 6:
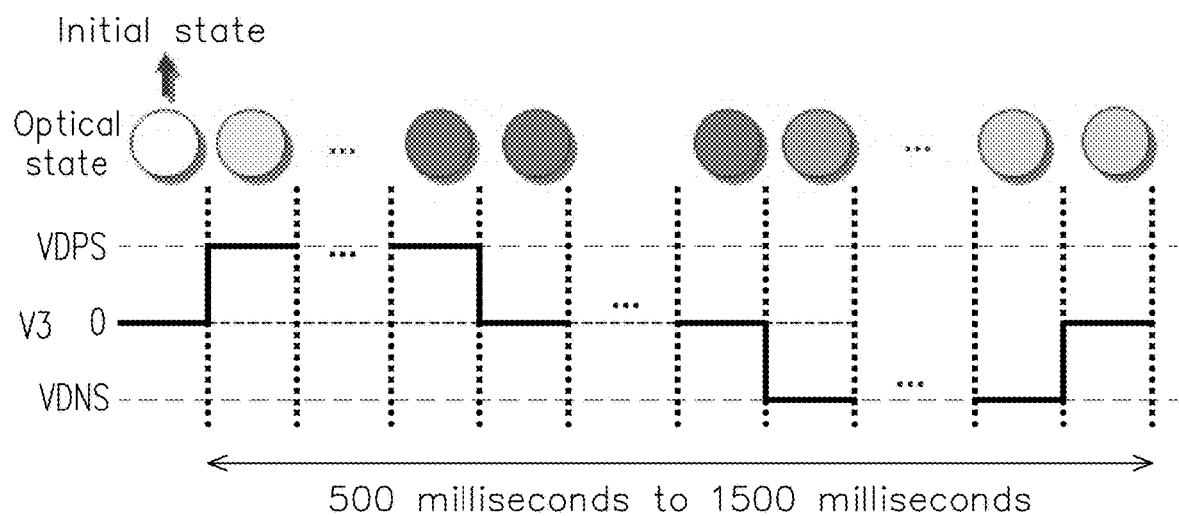

FIG. 4, FIG. 5, and FIG. 6 are schematic diagrams of a set of signal waveforms according to an embodiment of the invention. Referring to FIG. 4 to FIG. 6, driving a signal waveform V1 shown in FIG. 4 is, for example, driving an optical state of a particle in the e-paper display panel 110 to change from an initial white state to a black display state. Driving a signal waveform V2 shown in FIG. 5 is, for example, driving an optical state of a particle in the e-paper display panel 110 to change from an initial black state to a white display state. Driving a signal waveform V3 shown in FIG. 6 is, for example, driving an optical state of a particle in the e-paper display panel 110 to change from an initial white state to different gray display states. In FIG. 4 to FIG. 6, voltages VDPS and VDNS are high and low levels for driving the signal waveforms V1, V2, and V3, respectively. Moreover, drive durations for driving the signal waveforms V1 and V2 are 100 milliseconds to 300 milliseconds, which are shorter than a drive duration for driving the signal waveform V3: 500 milliseconds to 1500 milliseconds. In FIG. 4 to FIG. 6, time lengths for driving the signal waveforms V1, V2, and V3 and appearances thereof are merely for illustration, and the invention is not limited thereto.

Therefore, the display controller 130 calls the graphics library 120 according to the line segment input signal S1 to control the display driver 130 to generate the set of signal waveforms V1, V2, and V3 shown in FIG. 4 to FIG. 6. The set of signal waveforms V1, V2, and V3 can drive the e-paper display panel 110 to display the line segment 200 including a plurality of gray levels. In addition, the line segment 200 may include a plurality of gray levels, for example, G0 to G30. For a manner of generating the set of signal waveforms and structures and operation of the display controller and the display driver, sufficient teaching, suggestions and implementation instructions may be obtained from general knowledge of the technical field.

Figure 7:
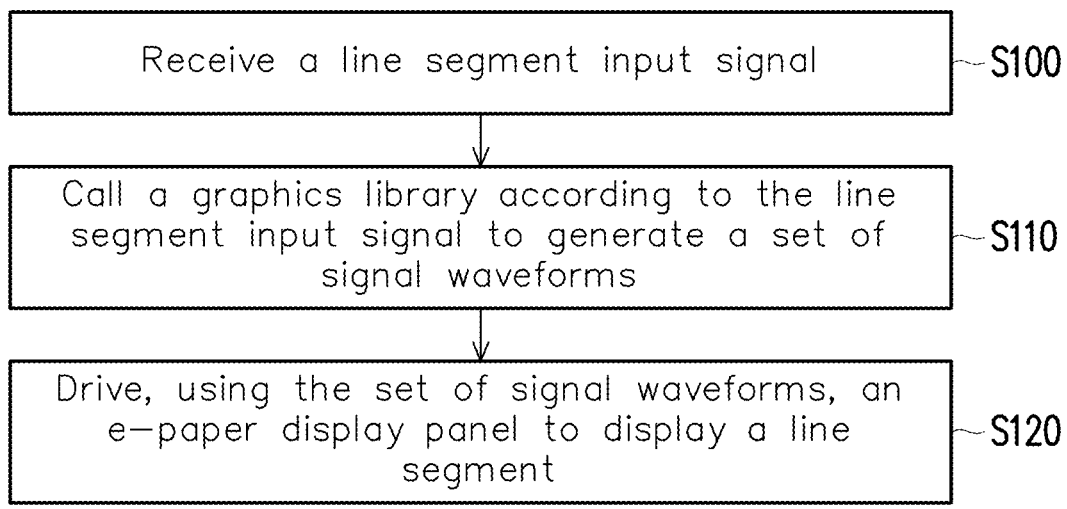
FIG. 7 is a flowchart of steps of a method for driving an e-paper display device according to an embodiment of the invention.

FIG. 7 is a flowchart of steps of a method for driving an e-paper display device according to an embodiment of the invention. Referring to FIG. 1 and FIG. 7, the driving method in the present embodiment is applicable to at least the e-paper display device 100 in FIG. 1, but the invention is not limited thereto. The e-paper display device 100 in FIG. 1 is used as an example. In step S100, the display controller 130 receives a line segment input signal S1. In step S110, the display controller 130 calls a graphics library according to the line segment input signal S1 to generate a set of signal waveforms V1, V2, and V3. In step S120, the display controller 130 drives, using the set of signal waveforms, the e-paper display panel 110 to display a line segment including a plurality of gray levels. In addition, for the method for driving the e-paper display device in the embodiment of the invention, sufficient teaching, suggestions, and implementation instructions may be obtained from the descriptions of the embodiments of FIG. 1 to FIG. 6.

Based on the above, in order to resolve the problem that the original static database SWTCON can only be used to draw a black line such that a zigzag line segment is generated on an e-paper display device with a relatively low resolution, in the embodiment of the invention, the display controller does not use a function originally used to draw lines in the static database SWTCON but call a SKIA graphics library in the Android system, so as to generate a handwritten line segment with gray level compensation, and then use the set of signal waveforms, so that a relatively smooth line segment can be drawn.

Although the invention has been disclosed as above with the embodiments, the embodiments are not intended to limit the invention. Any person with ordinary knowledge in the technical field can make some changes and modifications without departing from the spirit and scope of the invention. Therefore, the scope of protection of the invention shall be subject to the attached claims.

What is claimed is:

1. An e-paper display device, comprising:
   an e-paper display panel;
   a graphics library, wherein the graphics library of the e-paper display device serves to generate a smooth line segment comprises a plurality of gray levels, wherein the plurality of gray levels comprises a white gray level, a black gray level, a first gray level, and a second gray level; and
   a display controller coupled to the e-paper display panel and configured to receive a line segment input signal and call the graphics library according to the line segment input signal, and then drive, using a set of signal waveforms, the e-paper display panel to display the smooth line segment, wherein the set of signal waveforms is generated according to the line segment input signal and the graphics library of the e-paper display device.

2. The e-paper display device according to claim 1, wherein the graphics library is a two-dimensional graphics library.

3. The e-paper display device according to claim 1, wherein the graphics library is a SKIA graphics library.

4. The e-paper display device according to claim 1, wherein the line segment input signal is a handwritten input signal or a pen-written input signal.

5. A method for driving an e-paper display device, comprising:
   receiving a line segment input signal;
   calling a graphics library included in the e-paper display device according to the line segment input signal to generate a set of signal waveforms, wherein the graphics library of the e-paper display device serves to generate a smooth line segment comprises a plurality of gray levels, wherein the plurality of gray levels comprises a white gray level, a black gray level, a first gray level, and a second gray level; and
   driving, using the set of signal waveforms, an e-paper display panel to display the smooth line segment.

6. The method for driving the e-paper display device according to claim 5, wherein the line segment input signal is a handwritten input signal or a pen-written input signal.

7. The method for driving the e-paper display device according to claim 5, wherein the graphics library is a SKIA graphics library.

8. The method for driving the e-paper display device according to claim 6, wherein the graphics library is a two-dimensional graphics library.

* * * * *